United States Patent
Vogt

[19]

[11] Patent Number: 5,804,026
[45] Date of Patent: Sep. 8, 1998

[54] METHOD FOR PRODUCING IDENTITY CARDS, AND IDENTITY CARD PRODUCED ACCORDING TO THAT METHOD

[75] Inventor: Werner Vogt, Schlieren, Switzerland

[73] Assignee: Interlock AG, Schlieren, Switzerland

[21] Appl. No.: 598,672

[22] Filed: Feb. 8, 1996

[30] Foreign Application Priority Data

Feb. 9, 1995 [DE] Germany .................. 195 04 194.1

[51] Int. Cl.$^6$ ................................ B42D 15/10
[52] U.S. Cl. ............ 156/295; 156/324; 264/272.17
[58] Field of Search ........................ 156/295, 108,
156/267, 273.7, 275.5, 313, 324; 264/272.17

[56] References Cited

U.S. PATENT DOCUMENTS

| | | | |
|---|---|---|---|
| 4,450,024 | 5/1984 | Haghiri-Tehrani | 264/272.17 |
| 4,746,392 | 5/1988 | Hoppe | 156/295 |
| 4,961,893 | 10/1990 | Rose | 264/272.17 |
| 4,999,065 | 3/1991 | Wilfert . | |
| 5,030,407 | 7/1991 | Mollet | 264/275 |
| 5,346,576 | 9/1994 | Kobayashi | 156/295 |
| 5,387,306 | 2/1995 | Jarvis | 264/272.17 |

FOREIGN PATENT DOCUMENTS

| | | |
|---|---|---|
| 0399 410 A2 | 5/1990 | European Pat. Off. . |
| 0 621 139 A1 | 4/1994 | European Pat. Off. . |
| 2267291 | 12/1992 | United Kingdom . |

*Primary Examiner*—Daniel Stemmer
*Attorney, Agent, or Firm*—Darby & Darby

[57] ABSTRACT

For producing identity cards, access cards, identification cards, or the like, containing electronic and/or electric components, including such with outwardly directed contacts, it is proposed that at least one central layer of the card, containing also the electronic and/or electric components or consisting thereof, be initially retained in floating condition by adhesive quantities applied as floating mass at least on one inner face, and be then progressively compressed to a thickness that is predetermined by stops, without any application of heat, and be finally cured so that the electric and/or electronic components are supported in the finished card, embedded in the intermediate adhesive layer so formed.

18 Claims, 2 Drawing Sheets

METHOD FOR PRODUCING IDENTITY CARDS, AND IDENTITY CARD PRODUCED ACCORDING TO THAT METHOD

BACKGROUND OF THE INVENTION

The present invention relates to a method for producing identity cards and relates also to an identity or identification card, especially one of a structure containing electronic or electronic components. Such a card, which may be employed for applications of any kind, is commonly also known as chip card. The invention further relates to a device allowing the production of the cards on the basis of that method.

In the case of such chip cards or, generally, in the case of carriers containing, among other elements, electronic or merely electric components, i.e. in the simplest of all cases a coil and/or a capacitor tuned to a specific frequency in the way of a resonant circuit, which allows the implementation of access control systems, anti-theft devices by fastening such carrier elements to goods, personal verification systems, and the like, production may give rise to considerable problems.

Normally, such (chip) cards or carrier elements, which latter also often exhibit the shape of a card or in any case the shape of a flat element, are produced by means of usual, known laminating techniques which means that a plurality of layers, consisting for example and preferably of PVC, are united, i.e. laminated together in a laminator under the combined action of heat and comparatively high pressure, which means that the different layers of the card, i.e. at least their adjacent surfaces, are heated up by the heat so applied to a state where they are united, i.e. welded together, in these areas in a practically inseparable way.

A laminating process of this type, which distinguishes itself by the action of heat and pressure, may for various reasons be found to be unsuited for embedding sensitive electronic components, because the latter are at least exposed to considerable forces, may suffer and even be destroyed by the laminating process, while another aspect relates to the possibility that the electronic components may show, i.e. become detectable, through the surfaces of adjacent card layers. It is, therefore, undesirable for such components to contact or to be positioned directly against the adjacent layers, and this also because the components do not necessarily have a perfectly plane smooth surface, but may exhibit scores or open spaces which may give rise to undulations or to adjacent molten plastic material flowing into such open spaces, which again may have a destroying effect.

Although many attempts have been made to produce chip cards meeting even high demands, practically without waste with the aid of usual laminators or laminating processes, this aim has not been reached over the years, as one always encounters insurmountable limitations, and this even if—a procedure obviously suggesting itself with laminating processes—one resorts to varying a plurality of effective parameters so that while one gets closer to the desired result, it is not possible with the known laminating process to arrive at a one hundred percent success. In applicant's production, for example, a functional limit as low as 95% was achieved, in spite of many efforts made over the years and even when using most complex implementation approaches for the lamination process.

To name only a few out of the broad range of known laminating processes, reference is made to European Patent Application EP 0 621 139 A1, European Patent Application EP 0 399 410 A2, U.S. Pat. No. 4,999,065 or British Patent Application GB 2 276 291 A.

SUMMARY OF INVENTION

Now, it is the object of the present invention to provide a production method, and means for its implementation, for a carrier element, usually one in the form of a card, containing electric or electronic components, i.e. especially for a chip card, telephone card or another identity card of any kind, which while having an attractive appearance may include even larger electronic and/or electric components of any shape and in any distribution and which guarantees that any damage of such components by the production method will by reliably excluded.

The invention achieves this object and provides the advantage that it is now possible to produce carrier elements and/or chip cards that may contain, in sort of a separate intermediate layer, even highly sensitive electric and/or electronic components of any desired thickness, shape and dimensions, which components or chips are supported during the production process between the cover layers in an embedding mass, i.e. substantially without contact with the adjacent layers of the card or of the carrier element and—as will be easily apparent—can remain fixed and supported in this position after curing of the embedding mass, while the mass as such forms a discrete layer of predetermined thickness, clearly distinguishable from the other layers, within the layered structure constituting the card or the carrier element.

By positioning the electric and electronic components in perfectly spaced arrangement within the remaining card layers, which as such may in simple embodiments constitute cover layers or else form additional intermediate layers, depending on the particular implementation of the final card, advantages are achieved not only in respect of the initial embedding and accommodation of those components, but also during subsequent use, because mechanical stresses or pressure will not be transmitted directly to the electric or electronic components, as the latter are safely held and protected within their own, cured layers of embedding mass.

This, therefore, also enables electric or electronic components of any size to be integrated in corresponding carrier elements or cards, including for example antenna shapes consisting of a plurality of usually printed-on windings, which in combination with miniaturized capacitors and other electronic components may also form resonant circuits permitting non-contact scanning methods to be employed.

Thus, it is an advantage of the present invention that by abandoning the basic principles of usual lamination processes the electronic or electric components can be integrated in the card or the carrier element free from stress, can be sealed therein and utilized during use of the card, while the invention further simplifies the production of such a card insofar as the basically complex parameters, which always require careful tuning to different materials, their kind, thickness and other properties, are replaced by sort of a "gluing process", although this term does not define the conceptual scope of the invention. In any case, however, the application of heat is no longer necessary, and the application of pressure, which heretofore had to be very strong, is now properly adjusted and limited in such a way that the mass, which includes at least the electric or electronic components, is caused to form additional card layers after its solidification or curing. It is, thus, apparent that due to the complete absence of heat and the limited, very careful application of pressure the production process is now abso-} lutely free from stress exerted on the electronic or electric components so that one does not have to expect neither waste caused by the production process, nor trouble during subsequent use.

Although it has been known as such, or in connection with laminating processes, to insert (plastic) layers with one or two adhesive surfaces between separate (plastic) layers that are to be bonded together, these arrangements always served the purpose to bond the adjacent laminate layers together, the bond so obtained being the better and the more favorable, the more pressure and, if applicable, heat is applied. These "adhesive layers" encountered in usual laminating processes are, therefore, (only) extremely thin as they do serve any function of their own so that, accordingly, there was no risk that the adhesive layers may come off the layered structure during the production process or at some later time.

This situation is quite different with the present application, as here the bonding mass or the glue, or the semi-liquid adhesive plastic substance, is added in such ample quantity as to permit the "floating" inclusion of the electric or electronic components, if necessary even together with their own flat carrier layer, whereafter these adhesive masses, spreading absolutely uniformly over the entire card area during the production process, will cure to form discrete layers of the card so produced, which layers exhibit a practically uniform thickness at all points and may insofar be described as laminate layers. Being so embedded in the mass of the layer, the components are safely and reliably held, supported and also protected from their production to their subsequent use, and are also protected from showing through or from getting into contact with adjacent layers, whereby they might otherwise become visible under correspondingly transparent conditions.

Another advantage of the invention resides in the fact that the embedded electric or electronic components, just as the whole central (carrier) layer of such components, if present, may well contain inclusions, projections, open spaces, or the like, as such inclusions or projections are balanced out and integrated by the proposed production method. It would, therefore, also be correct to say in connection with the production method according to the invention that the electric and/or electronic components are sort of floated into the card; they are supported loosely between adjacent layers and are not exposed to any pressure as the latter is absorbed by the mass embedding the components and is, besides, utilized by the mass for spreading as a uniform layer between the adjacent outer layers, to fill the space and to then cure; it must be noted in this connection that such spreading will not cause the embedding layer or mass to flow out beyond the marginal areas, since the pressure applied will stop virtually fully-automatically as soon as it can be judged by the quantity of the correspondingly semi-liquid, highly viscous glue or adhesive that the mass, which includes the electric and electronic components, will in any case have spread uniformly over the whole card surface.

This initially constant application of pressure, which then stops when a predetermined thickness has been reached, can be achieved by stops for a (upper) pressure plate, due to which the latter can be approached to a (lower) backing-up plate—which two plates include between them the card layers to be bonded together—only to an extent complying with the actual thicknesses of the inserted partial layers of the card, plus the permitted thickness of the adhesive layers (on both sides).

The invention opens up a plurality of novel approaches for implementing preferably card-shaped chip-carrying elements, as it is now possible for the first time to integrate even highly complex electronic systems into a card shape, without any problems, and this even if such systems are exceptionally sensitive or difficult to embed, or if their shapes are such that it would be impossible to process them with the aid of usual laminating techniques.

BRIEF DESCRIPTION OF THE DRAWINGS

Some preferred embodiments of the invention, as well as the method according to the invention, will be described hereafter in more detail by reference to the drawing, in which:

FIG. 2 shows a top view of the card structure according to FIG. 1, taken along line 11—11, whereas

DETAILED DESCRIPTION OF THE INVENTION

It is the basic idea of the present invention that for producing a carrier element, preferably of the usual card shape, to serve as an identify card, access card, chip card, or the like, the electric and/or electronic components required and desired in each case are sort of floated into the card structure, i.e. are practically loosely supported therein at the outset, that thereafter a card lamination is produced by applying a suitably adjusted continuous pressure, which is finally halted by the action of a stop, and that finally the floating mass layer for the electric or electronic components are caused to cure so as to form a discrete layer within the card structure, which latter is bonded together absolutely inseparably due to the fact that the floating mass layer is at the same time an adhesive layer.

Figure 1:
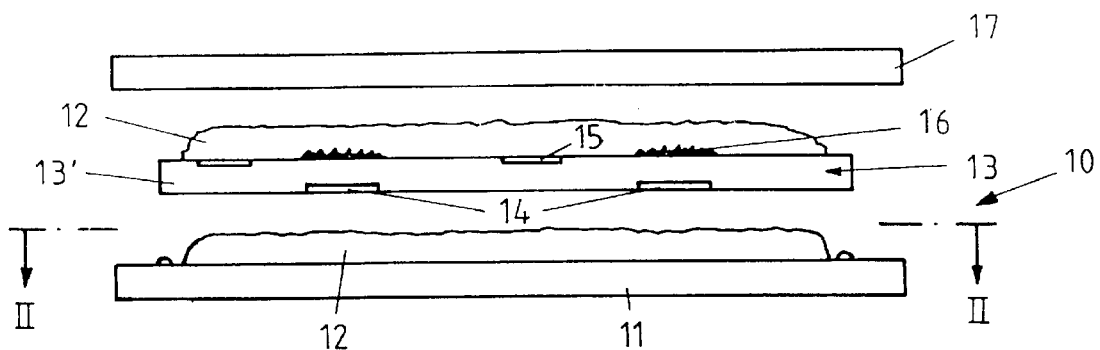
FIG. 1 shows a side view of a first possible layered structure of a card to be produced, with soundly integrated electric or electronic components.

A first possible embodiment of the invention is shown in FIG. 1 and relates to the process of producing the finished card, with the integrated electronic and/or electric components, from individual card layers or laminate layers.

There is provided for this purpose a lower or first partial card layer 11, preferably in the form of a PVC layer, and again preferably with oversize dimensions relative to the card, to which an adhesive or glue is applied in predetermined quantity in the form of a moldable mass. The adhesive or glue may also consist of a semi-liquid, correspondingly viscous plastic material and may have any desired properties, if only curing of the adhesive mass occurs at the end of a corresponding period of time, whereby a rigid layer is obtained, which of course remains elastic within certain limits and which due to its excellent adhesive properties produces at the same time an intimate bond with adjacent (partial) card layers.

Figure 2:
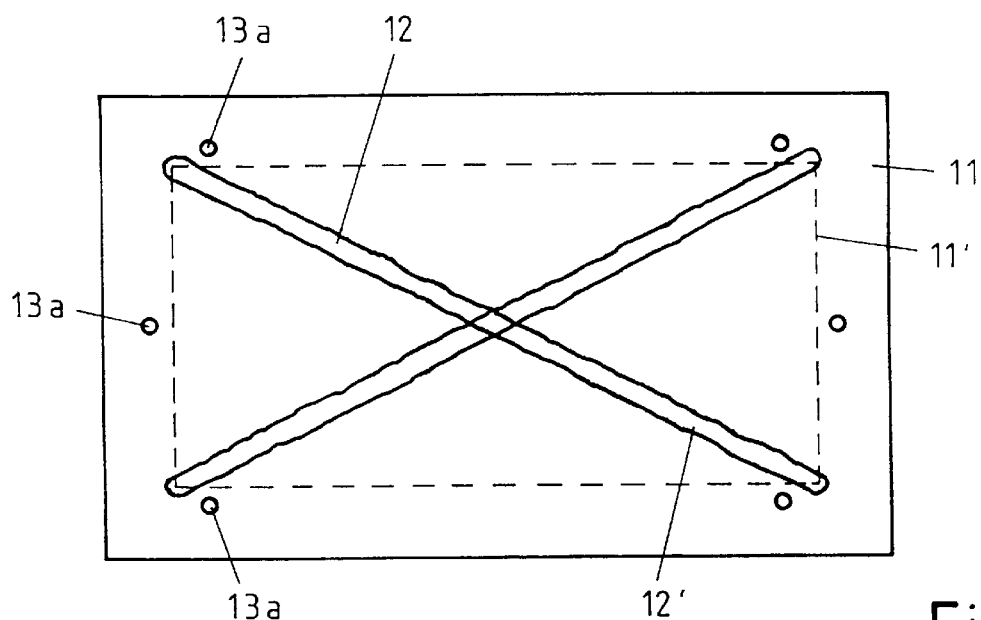

The adhesive mass—this term will be mainly employed hereafter throughout the further description—is designated by reference numeral 12 and may, as for example in the top view of FIG. 2, consist of two ropes or beads of adhesive that cross each other and that have been applied in a suitable way on the lower (PVC) card layer, in the simplest of all cases by hand using a suitable dispensing device, but preferably of course by a fully-automatic process in which latter case the quantity applied can be adjusted more precisely.

The explanations that follow will also provide a better understanding of the required and/or desirable properties of the adhesive mass; accordingly, the following description will relate initially to the further procedural steps that will be described with reference to the representation of FIG. 1. The described arrangement is followed on top by a central layer 13, that may be composed of a flat carrier or carrier layer 13' and of electronic or electric components supported by, contained in or fastened on the layer in some other way, as for example a printed coil winding 14 applied by usual laminating techniques and serving as antenna, integrated circuit components 15, further electric or electronic components 16 mounted on the carrier layer 13' by usual known SMD techniques, or the like. SMD is the abbreviation of "surface mounted device" and means a small electric component that has been fixed on a carrier surface by gluing and is also connected with it electrically, most suitably by dip-soldering.

From the representation of FIG. 1 it appears that the central layer 13 may of course also comprise inclusions, projecting parts, channels or the like, which means that the electric/electronic structure may have any desired shape and may be adapted to the particular requirements of each case.

Again, a measured quantity of the adhesive mass 12 is applied on that intermediate layer or central layer 13, for example again in the form of ropes crossing each other, it being understood that it would of course also be possible to apply that glue on the bottom face of a last, upper (PVC) cover layer 17, but then of course on its surface facing the laminate.

Figure 4:
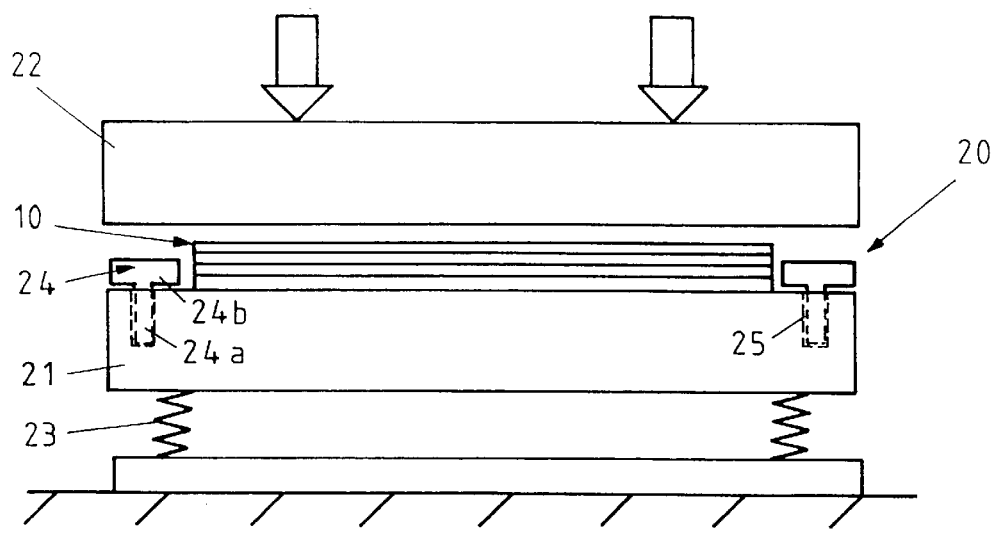
FIG. 4 shows a first possible embodiment of a device for producing a card laminate under limited pressure, that includes at least one adhesive layer formed by solidification after "lamination" of the card structure.

It is further understood in this connection that the adhesive mass 12 may be applied in an absolutely arbitrary manner, i.e. in the form of a central spot or of two central spots, conveniently distributed in symmetrical arrangement over the respective surface; the quantity of the adhesive mass so introduced between the layers must in any case be determined by suitable investigations, examinations or calculations so that when the adhesive mass is uniformly distributed to form a flat coating on the adjacent surfaces the adhesive layers so formed will have a given thickness, i.e. a thickness that can be predetermined and fixed in advance without difficulty and that must in any case permit the central layer 13, together with its electric or electronic components, to be sort of floated into the space between the two cover layers 11 and 17 and to be sort of loosely held in that position, in any case during a first phase. In this connection the term "during a first phase" is meant to describe the fact that this "loose" positioning of the central layer 13 or, in the case of other embodiments, merely of electric or electronic components, is maintained until the adhesive mass embedding that layer or the components has cured. The further production process then consists of placing the layered structure 10, which will later form the finished card, with the dims or spots or ropes of adhesive applied therebetween, into a suitable, but decisively modified press 20 of the kind shown in FIG. 4. Due to the dims of adhesive being still locally concentrated, at least in the illustrated example, in the form of ropes or in other form, the thickness of the layered card structure comprising the layers 11, 13 and 17 is not yet defined; the layered card structure is then compressed to a defined thickness by the press 20 illustrated in FIG. 4. In this connection, the following should be noted. The press 20 as shown in FIG. 4 comprises a lower backing-up plate 21, an upper pressing plate 22 and resilient supporting means 23 for the lower backing-up plate which ensure that when pressure of any kind is produced by the upper pressing plate 22 by some action or other, the pressure exerted on the card structure 10 present in the press will not exceed the respective predetermined and preset values. This is ensured by springs 23 supporting the backing-up plate 21, which ensure during the downward movement of the pressing plate 22—which movement may take place at any desired pressure, but must be distributed over a predetermined period of time—that the springs 23 respond resiliently so that, as will be readily seen, the pressure actually encountered between the two plates 21, 22 will be limited by the counter-pressure exerted by the springs 23. It is understood that, for example, compressed air may also be used for actuating the pressing plate 22, in which case the planeness can be assured with particular ease since compressed air will act uniformly on all parts of the upper pressing plate. Due to the limited pressure applied on the card structure 10, acting uniformly on the entire surface, the structure will be compressed for a predetermined period of time, depending on the lowering speed of the pressing plate 22. The compression at limited pressure has the result that the adhesive ropes 12, 12', or to say it more generally the adhesive mass placed between the layers, will be progressively flattened and, consequently, spread over the entire available surface, in line with their viscosity and their flow, it being understood that the compression speed must be adjusted to the flow of the adhesive whose quantity must be adjusted to the desired thickness of the adhesive layer so produced, and that the limitation of the pressure together with the time for which the pressure is applied—likewise adjusted to the flow or viscosity of the adhesive mass—must ensure that the latter is given the opportunity to spread uniformly over the entire surface. If, for example, two adhesive spots are applied at a distance one from the other, then this will also result in absolutely perfect, uniform spreading of the adhesive in the form of a layer, since at the beginning the spots will migrate toward each other as pressure is gradually exerted, and when they have reached each other, the spots will try to escape laterally and to utilize the whole space available so that as a result an ideal combination will be achieved between the production of the laminate and the necessary degrees of freedom to permit floated embedding of the sensitive electric or electronic components.

It is of course understood that the pressure is not applied continuously as this would lead to a constantly increasing pressure build-up since the resilience of the layered card structure would of course be limited by the latter's finite thickness; in contrast, the movement of the pressing plates 21 and 22 toward each other caused by the pressure is stopped when a predetermined overall thickness of the layered card structure is reached, whereby a predetermined card thickness—that can be determined in the following way—is adjusted and finally reached. To determine the final thickness, the partial thicknesses of the different layers, which are invariable due to physical factors, are added up, and the layer thicknesses X1 and X2, which the distributed adhesive masses are to assume in the laminate on either side of the central layer 13, are determined. One thereby arrives at an overall laminate thickness of $$D_G = d_{11} + d_{13} + d_{17} + X1 + X2.$$

Once this overall laminate thickness, which then represents the thickness of the finished card, is reached during the pressing process, the pressing process and/or the movement of the two pressing plates 21 and 22 one toward the other is stopped, interrupted or braked in some other way, whereafter the adhesive layers are caused to cure. The thickness of these layers need not be greater than approximately 0.1 mm on both sides of the central layer 13, but may be selected at desire, depending on the requirements of the electronic and electric components that are to be covered, floated and—insofar—to be loosely supported at the beginning of the process, which can be achieved by suitable adjustment of the final finite measure of the spacing to be reached and the quantity of adhesive to be applied.

The embodiment illustrated in FIG. 4 shows a special implementation of the invention where stops 24 or stop marks are provided in a suitable way for stopping the pressing operation when the desired predetermined final thickness of the card lamination has been reached, the stops 24 being arranged between the two pressing plates 21, 22 to define a precisely predetermined thickness and, thus, the final spacing. It is understood that it is also possible with such an advantageously simple, but practical device to provide different stops 24, each consisting of a shank portion 24a and a small head 24b; while the shank portion serves for being loosely inserted into a suitable receiving bore 25 in the backing-up plate 21, the height of the head portion 24b, which may be defined by different machining processes (grinding) may serve to preset different thicknesses so that by keeping a suitable number of different spacer elements 24 on stock it is possible to predetermine different thicknesses for a plurality of chip cards.

In summary, the production process of such a card is such that the upper pressing plate 22 is lowered mechanically toward a lower backing-up plate 21, in a suitable way and for a finite time of approach, without there being a need, at least in this example, to consider the effective pressure exerted on the upper plate 22, since the lower backing-up plate 21 is in a position, via its spring support 23, to yield resiliently and to thereby absorb or take up any excessive pressing forces. These will not become active for compressing the layered card structure in the course of the downward movement of the pressing plate 22. As soon as the predetermined final card thickness is reached, the stops 24 become active to limit the further relative downward movement of the pressing plate 22—or to say it in other words: The thickness reached is maintained constant.

This also provides the possibility to lower the upper pressing plate 22 for example by means of a toggle-lever mechanism, that may even be operated by hand, and to move it at the end of its travel over the dead center position in order to secure it in this position until the card lamination can be removed during to the next upward movement of the plate. As mentioned before, any excessive movements of the upper pressing plate 22 are balanced out by the resilient supporting means 23 of the lower plate.

Thereafter, the uniformly distributed adhesive or glue layers are cured in accordance with the respective properties of the material and the properties of the adhesive, glue or plastic bonding substances used; normal curing may take several hours; however, it is also possible to use adhesive masses equipped with certain specific properties that make them UV curing, which means that they contain light-sensitive components that ensure curing within a shorter period of time.

This can be achieved by giving preference to such UV curing adhesive substances or corresponding additions that instead of curing abruptly under the effect of UV radiation (so-called radical systems) are merely initialized by an initial UV radiation whereafter they will cure gradually, but within shorter periods of time, for example a few minutes (cationic systems). Before the respective (opaque) cover layers are placed on the adhesive masses previously applied, it is possible in this case to expose the adhesive masses shortly to a UV radiation, to then complete and press the layered card structure and to leave it thereafter in the press until it has completely cured, although this latter step is not a requirement because following the initial pressing step, and after the adhesive layers have assumed the shape of a layer, they will not change their dimensions and extension any more. This can be achieved, for example, by corresponding selection or adjustment of the floating mass.

Another aspect may also be of importance in this connection; it has been mentioned before that the outer layers forming the layered card structure are oversized because it cannot be ensured, even if the adhesive masses applied are measured exactly, that the spreading adhesive mass will reach and uniformly cover even the extreme outer marginal edges. If—as shown in the top view of FIG. 2—oversized original laminate layers are used for the production of the layered card structure 10, it is in any case ensured that the adhesive masses applied will spread over and uniformly fill the surfaces made available by the different layers at least within the limits of the final dimensions of the card as indicated by broken lines in FIG. 2 and by reference numeral 11'. The selection of oversized original partial layers is recommendable also in order to permit working with adhesive quantities at or below the limit quantities that would be required for completely covering the oversized layers. "Laminate layers" having the final dimensions of the finished card would lead to a situation where even slight inaccuracies in applying predetermined adhesive quantities would permit adhesive to escape from between the edges, a condition that is undesirable and may even lead to blocking of equipment elements. Due to the oversize of the partial layers used, the quantities of the adhesive masses applied are not critical and may, if desired, even be measured manually, because the added quantity of adhesive only has to ensure that the inner actual card format 11' must be covered with a uniform adhesive layer of predetermined thickness on both sides of the electronic components.

Figure 3:
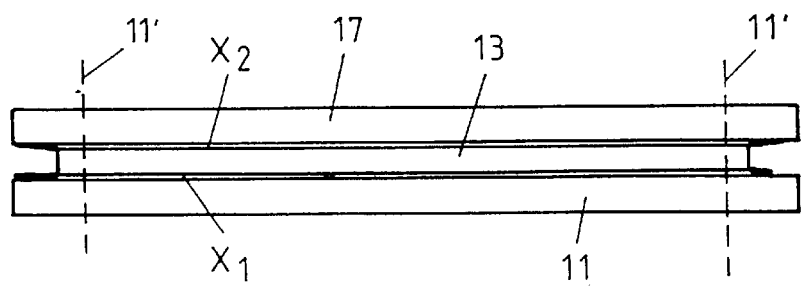
FIG. 3 shows the finished, cured compressed lamination of the card shape so produced, which latter will be brought to the final external dimensions of a usual card by a subsequent processing step.

After curing of the adhesive layers designated by X1 and X2 in the cross-sectional view of FIG. 3, it is then merely necessary to cut the finished card structure to the usual dimensions of such card formats, for example by punching. If such a punching operation is not recommendable, in view of the particular materials selected, then the punching operation may be carried out in such a way as to leave a larger margin, whereafter the final card format can be produced by a finishing operation, by marginal milling or the like, on suitable automatic machines.

Figure 6:
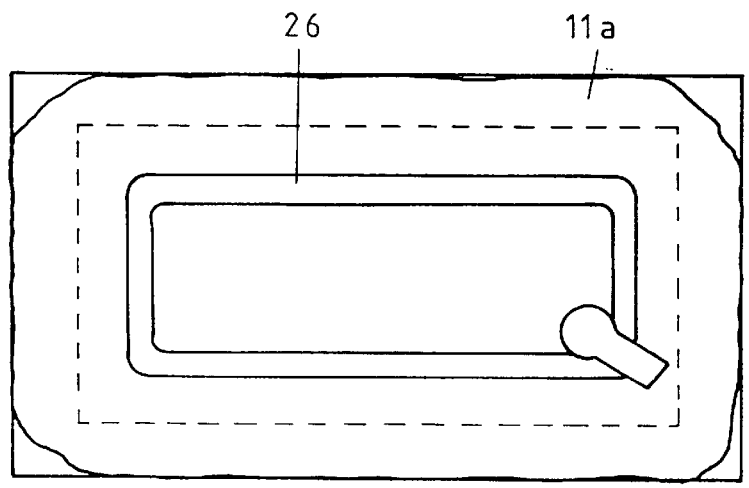
FIG. 6 shows a top view of one possible embodiment of an intermediate product with embedded electric or electronic components supported on a carrier layer and enclosed on all sides by the embedding mass, where this additional adhesive layer can be exposed on top by drawing off the topmost layer, the latter consisting for example of a cover layer provided for the original bonding process.

It is also possible with the aid of the method according to the invention to produce semi-finished products, for example intermediate layers, of the kind used as intermediate layer 13 in the starting products according to FIG. 1. As shown in FIG. 6, there may be provided in this case a lower carrier layer 11a, consisting for example of a suitable, transparent plastic material and having also a corresponding oversize, which may then be equipped with the respective electric and/or electronic components, for example by placing them on the carrier layer 11a, inserting them into corresponding groove-like recesses 26 provided therein (for forming antennas) or by connecting them in some other way provisionally with the carrier layer 11a. This carrier layer then serves as the lower layer in the embodiment described before by reference to FIG. 1 and the following Figures, and it is then also possible to apply on that carrier layer and/or the electronic and electric components positioned or arranged thereon the required quantity of adhesive, for example in the form of beads, spots of the like, and to finally place thereon for example a simple thin paper layer which can be removed later when it is no longer required. If the whole structure is then placed in a press 20, as illustrated in FIG. 4, the adhesive mass will be urged into all openings, open spaces, interspaces, or the like, and will also migrate in outward direction so as to form a layer on the carrier plate, so that here again the electronic or electric components are loosely embedded or floated in until the final thickness is reached at which the adhesive layer, being produced in this case by a single application of adhesive, has reached its desired predetermined thickness. One succeeds in this way in anchoring and sealing-in the components on the carrier plate 11a in a protected and undisturbed way, and in fixing them simultaneously on the plate so that such a starting layer, with the components mounted thereon, may then be used as intermediate product for further processing—also by the normal, i.e. usual laminating steps—in combination with further card layers, or as intermediate layer 13, in accordance with the procedures described before in connection with the illustration of FIG. 1. If processed in this way, the adhesive layer forms itself the central layer.

Figure 5:
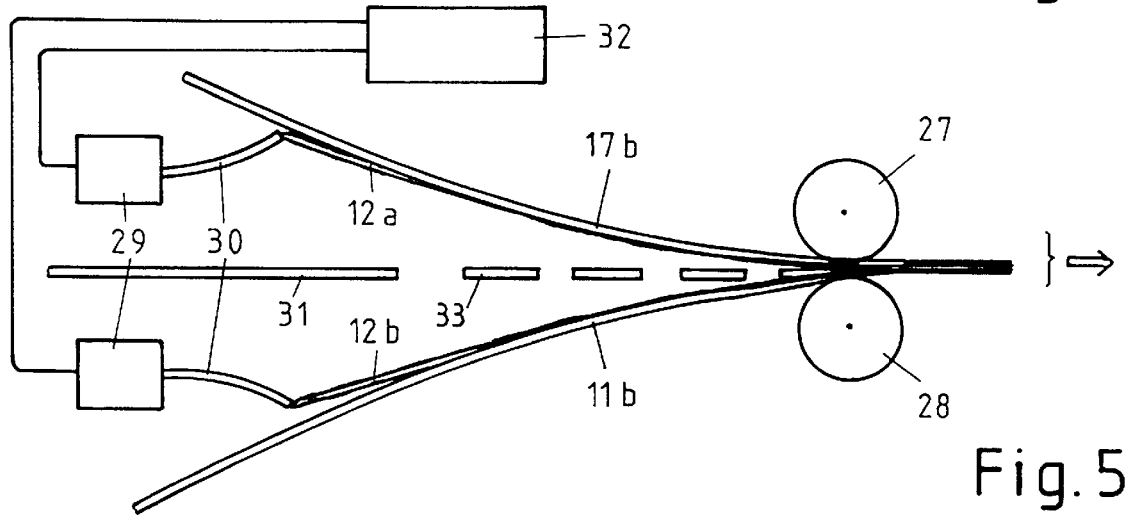
FIG. 5 shows another possible embodiment of a device for producing card-shaped carrier elements for electric and electronic components, where the continuous supply of lamination materials is effected by means of rolls or cylinders.

Another possibility of producing corresponding card shapes by bonding is illustrated in FIG. 5 and comprises a more continuous operating sequence, wherein the upper and lower cover layers 11b, 17b, which may also take the form of webs that can be drawn off suitable supply rolls, are fed in mutually aligned arrangement to a pair of pressing rolls 27, 28 forming between them a (adjustable) nip of predetermined width.

If it is intended in this case to produce chip cards conforming to the layered card structure illustrated in FIG. 1, then corresponding ropelike strings of adhesive 12a can be applied continuously on the insides of the webs 11b, 17b, for example the ones forming the outer layers, and this for example by automatic feeding systems in the form of supply tanks and pumps 29 provided with orifices 30 in suitable positions, while between the two webs either separate carrier elements 33, with the corresponding electronic or electric components mounted thereon, are introduced by means of suitable conveyor means, or a continuous carrier, likewise exhibiting the shape of a web 31 and equipped with the respective components, is introduced between the cover layers 11b, 17b, it being finally also possible to do without any carriers and to introduce the electronic or electric components directly into the gap opening up between the upper and the lower covers layers 11b, 17b. Here again, intimate loose and—insofar—floating embedding is achieved in the adhesive already adhering to the insides of the webs, which latter approach each other progressively as they enter the gap between the pair of pressing rolls 27, 28 until they reach the area of the narrowing nip, so that regarded over time the functional conditions are the same as described for the press according to FIG. 4; due to the increasing, but limited pressure the adhesive masses applied on both sides—but in certain cases also on one side only, especially when electronic and electric components alone are fed into the press—spread intimately around the components and on the adjacent inner surfaces of the webs 11b, 11b until uniform adhesive layers are formed in the narrowest gap between the pressing rolls 27, 28, which then form together with the electric or electronic components the central layer 13, unless clearly separate carrier layers are provided for the components, as indicated at 30 and 31.

The speed at which the continuous layered card structure is fed through the two pressing rolls 27, 28 is again adapted to the composition of the adhesive substance, its flow or viscosity, so as to ensure that the desired adhesive layers will have fully spread, at least in the narrowest gap between the pressing rollers, so that the subsequent cutting operation will produce card formats with perfectly distributed layers. The transport as such is preferably effected by drawing the layered card structure off at a point downstream of the rolls, i.e. in such a way that the rolls proper will not be driven, as this might lead to relative displacements.

The control of the adhesive quantities supplied from supply tanks, via pumps and orifices 30, is preferably effected in continuous operating sequences with the aid of a suitable control circuit indicated by 32 in FIG. 5, and with the aid of microprocessors with corresponding memory means for storing different adjustments and control sequences.

With respect to the representation of FIG. 1 it should be further noted that, as will be readily understood, in the case of the relatively thick adhesive ropes or spots on both sides of the central layer 13—or, generally, in all cases where electronic or electric components are inserted—there is a risk that these may get displaced or be pressed out, or change their position during the initial phase, last but not least due to possible sliding or slipping properties of the adhesive masses. So, it may be convenient for these reasons to arrange additional small retaining pins 13a for the central layer 13 on all sides of the upper and/or lower carrier or cover plate 11, 17, in places outside the card format, which retaining pins may become active by slight pressing so that the central plate 13, resting on the plastic ropes 12, 12', is arrested and fixed in position during the initial phase. During the final production process of the card, the punching or cutting process is then effected in such a way that these retaining pins and the excessive marginal areas are removed along the line 11' of the card format, as has been described before.

There is one essential fact regarding the numerous applications and advantages of the present invention that should be mentioned especially at this point. It is understood that the invention is suited not only for the chip card described before, comprising internal electronic means without any contacts to the outside, but can be employed with special advantage for the production of normal chip cards with contacts, i.e. chip cards that can make contact with external means, as for example telephone cards. In the case of such electronic cards with contacts, an electronic module is provided which is arranged in the card laminate in such a way that the contacts are freely accessible from the outside on one of the card surfaces so that when for example a telephone card is inserted, these contacts will establish physical contact with contract springs in the respective device, whereby a telecommunications connection is established with the chip and/or the module in the card.

According to a preferred approach for producing such chip cards with contacts, one of the respective outer laminate layers or films of such a card may be provided with a—preferably punched—opening for precisely accommodating the electronic module, or at least its outer contact. On the side which—later—forms the outside of the card, this opening is then preferably closed by a suitable transparent adhesive tape, such as is available for example under the trade name Scotchtape or Tesafilm; when the chip module has been properly mounted in the opening, the element surface then forms an outer card layer—in the case of the second embodiment, where the elements are supplied in the form of webs that are to be bonded together, for example the lower web.

Specifically, it is then possible, without any problems, to apply the adhesive/plastic mass or floating mass in the form of suitable ropes or spots on the inner faces carrying or containing the module with its outwardly projecting contacts; thereafter conveniently only one additional cover sheet is used which, according to the first embodiment, is pressed on with the aid of spacers so that the floating mass, with the module intimately surrounded by it and sort of cemented in, then forms the third inner and insofar central layer; or else the cover web is supplied in accordance with the second embodiment, and the two webs are passed through the pair of pressing rolls. In this case, too, the adjusted gap of predetermined width between the two pressing rolls then results in the formation of the third central layer from the mass originally applied as floating mass for the electronic module.

The mechanism resulting in this way consists in that the inner parts of the chip film or the chip layer, with the chip fixed thereon, is surrounded by the plastic floating masses, while the outer Tesafilm layer ensure perfectly plane contact and, besides, a perfectly homogeneous transition between the floating mass surrounding the module on all sides and the chip as such. This applies in particular when the original punched opening for the module did not perfectly fit the latter; the floating material penetrates into all spaces and interspaces so that the module is fixed in its card opening laterally, too. The adhesive tape is then pulled off, whereby the contacts of the module in the card are rendered freely accessible from the outside. Again, this process may be carried out automatically according to the second embodiment, where the outer adhesive tape covering the punched-out card opening may be additionally supplied—from the bottom in the embodiment of FIG. 2—and can be pulled off and wound up as a single piece before the individual cards are punched out. Such a production method is especially suited for modules comprising special insertion anchors or hooks, in which case the molding techniques previously used for such purposes, which are in part extremely complex and which add to the expense of such production quite considerably, are no longer needed.

Especially in the case of the second embodiment, which preferably uses webs that are drawn off corresponding supply rolls and are guided through a pair of pressing rolls, it is also possible to achieve the desirable provisional fixing of the chip, for which lateral retaining pins are provided in the first embodiment, by means of a suitable adhesive by means of which the respective electronic or electric components, i.e. chips or modules, are fixed on the respective adjacent card face, or provisionally fixed on the web 31 of the continuous carrier until the electronic means are embedded and, thus, cemented in place by the application of the floating mass, the latter being initially applied in the form of an adhesive and then caused to cure so as to form a third card layer.

Another interesting aspect should still be discussed:

If the floating mass (adhesive material) used is more of a low-viscous nature, it may be of advantage to provide sort of a floating barrier, which in the first embodiment consists of a small closed frame extending outside the dimensions of the card, and is placed on at least one inner film surface of the card so as to prevent the comparatively liquid adhesive masses from flowing over the outer edges of the card during the pressing operation. Such a small frame could then, as an alternative, simultaneously define by its thickness the thickness of the third or central layer to be formed by the adhesive mass, which latter also includes the electronic components. In certain pressing operations, this would also do away with the need to provide additional outer stops in the press. The frame may, however, also be intended to be lost, or may finally take the form of an integrally formed crimped rim in the respective card film, whereby rim-like raised portions would be created in the form of closed frames. These would then be cut off during the final finishing (punching) operation.

The same applies by analogy for the second embodiment, in which case lateral raised portions are provided in the continuous web, outside the dimensions of the finished cards, either in the form of separately applied elements (that may be fixed, for example, by gluing) or in the form of raised rim portions integrally formed in the card film material itself.

Finally, it should be noted that the claims and especially the main claim constitute attempts at putting the invention into words without a comprehensive knowledge of the prior art and, therefore, without limiting prejudice. The right is therefore reserved to regard all features depicted in the specification, the claims, and the drawings, whether individually or in any combination with one another, as essential to the invention and to write them into the claims, and to reduce the feature content of the main claim.

What is claimed is:

1. A method for producing an identity card sandwich, said method comprising the steps of:

positioning a plurality of card layers one on top of another, said plurality of card layers including at least an intermediate layer adjacent to a first of said plurality of card layers and at least one electronic component initially positioned on said intermediate layer;

applying adhesive to at least one out of a first surface of said intermediate layer and an inner surface of said first card layer adjacent to said first surface;

applying pressure without applying heat to said plurality of card layers to compress said card layers to a predetermined width; and curing said adhesive layer to secure said electronic component.

2. The method in accordance with claim 1 further comprising the steps of:

further positioning said intermediate layer in between said first card layer and a second of said plurality of card layers;

applying said adhesive to at least one out of a second surface opposite said first surface of said intermediate layer and an inner surface of said second card layer adjacent to said second surface; and said curing step further comprises said adhesive separating said intermediate layer from said second card layer.

3. The method in accordance with claim 1 further comprising the steps of:

positioning said intermediate layer in between said first card layer and a second of said plurality of card layers; and applying said adhesive to at least a portion of each of said first surface and said inner surface of said first card layer.

4. The method in accordance with claim 3 further comprising the step of:

after said curing step, cutting said plurality of card layers along an axis parallel to the thickness of said plurality of card layers in order to finish said identity card sandwich.

5. A method in accordance with claim 1 wherein said inner surface of said first card layer includes a plurality of stop components having a predetermined thickness so that said applying pressure step further comprises impeding the application of pressure between said inner surface of said first card layer and said first surface when said plurality of stop components engage said first surface.

6. A method for producing an identity card sandwich in a press, said press including at least one stop component having a predetermined thickness for providing an impediment to the application of pressure on said identity card sandwich by said press, said method comprising the steps of:

positioning a plurality of card layers one on top of another, said plurality of card layers including at least an intermediate layer adjacent to a first of said plurality of card layers and at least one electronic component initially positioned on said intermediate layer;

applying adhesive to at least one out of a first surface of said intermediate layer and an inner surface of said first card layer adjacent to said first surface;

applying pressure without applying heat to said plurality of card layers by actuating said press until said stop is engaged, whereby said adhesive is compressed in order to compress said plurality of card layers to said predetermined thickness of said stop; and curing said adhesive to secure said electronic component.

7. The method in accordance with claim 6 further comprising the steps of:

further positioning said intermediate layer in between said first card layer and a second of said plurality of card layers;

applying said adhesive to at least one out of a second surface opposite said first surface of said intermediate layer and an inner surface of said second card layer adjacent to said second surface; and said curing step further comprises said adhesive separating said intermediate layer from said second card layer.

8. The method in accordance with claim 6 wherein said applying adhesive step further comprises said adhesive exhibiting a predetermined flow adjusted to a pressing speed of said press and being applied at least one out of manually and automatically.

9. The method in accordance with claim 7 wherein said applying adhesive step further comprises said adhesive being applied by a continuous process.

10. The method in accordance with claim 6 wherein said adhesive is one of a plastic, a flowable adhesive and a glue.

11. The method in accordance with claim 6 further comprising the steps of:

positioning said intermediate layer in between said first card layer and a second of said plurality of card layers; and applying said adhesive to at least a portion of each of said first surface and said inner surface of said first card layer.

12. The method in accordance with claim 7 further comprising the step of:

after said curing step, cutting said plurality of card layers along an axis parallel to the thickness of said plurality of card layers in order to finish said identity card sandwich.

13. A method in accordance with claim 6 wherein said inner surface of said first card layer includes a plurality of stop components having a predetermined thickness so that said applying pressure step further comprises impeding the application of pressure between said inner surface of said first card layer and said first surface when said plurality of stop components engage said first surface.

14. A method in accordance with claim 6 wherein said at least one electronic component is secured to said first surface of said intermediate layer by a second adhesive.

15. A method in accordance with claim 6 wherein said identity card sandwich further includes an electronic module having a contact area, said first card layer having an aperture for receiving said electronic module, said method further comprising the steps of:

positioning at least said contact area of said electronic module in said aperture of said first card layer;

covering said aperture on an inner surface of said first card layer which is opposite to said inner surface of said first card layer with an electric module adhesive;

during said applying pressure step, said adhesive is further spread into said aperture in order to secure said electronic module to said first card layer; and once said electronic module is secured, removing said electric module adhesive so that said contact area of said electronic module is accessible through said aperture in said first card layer.

16. A method in accordance with claim 6 wherein a stop frame having a predetermined thickness is positioned on said inner surface of said first card layer so that said applying pressure step further comprises impeding the application of pressure between said inner surface of said first card layer and said first surface when said stop frame engages said first surface.

17. A method for producing an identity card sandwich, said method comprising the steps of:

positioning a plurality of card layers one on top of another, said plurality of card layers including at least an intermediate layer adjacent to a first of said plurality of card layers and at least one electronic component initially positioned on said intermediate layer;

applying adhesive to at least one out of a first surface of said intermediate layer and an inner surface of said first card layer adjacent to said first surface;

applying pressure without applying heat to said plurality of card layers until an impediment to the application of pressure is reached, whereby said adhesive is compressed in order to compress said plurality of card layers to a predetermined thickness; and curing said adhesive to secure said electronic component.

18. A method for producing an identity card sandwich in a press, said press including at least a plurality off springs having a plurality of predetermined fixed stops for controlling the amount that said press can compress said identity card sandwich, said method comprising the steps of:

positioning a plurality of card layers one on top of another, said plurality of card layers including at least an intermediate layer adjacent to a first of said plurality of card layers and at least one electronic component initially positioned on said intermediate layer;

applying adhesive to at least one out of a first surface of said intermediate layer and an inner surface of said first card layer adjacent to said first surface;

applying pressure without applying heat to said plurality of card layers by actuating said press;

during said applying pressure step, said plurality of springs permit a gradual sequence of motions according to said plurality of predetermined fixed stops for the application of pressure by said press, whereby said plurality of predetermined fixed stops determine a thickness of said plurality of card layers; and curing said adhesive to secure said electronic component.

* * * * *